United States Patent
Robison et al.

(10) Patent No.: US 10,033,721 B2
(45) Date of Patent: Jul. 24, 2018

(54) CREDENTIAL TRANSLATION

(71) Applicant: Dell Products, L.P., Round Rock, TX (US)

(72) Inventors: Charles D. Robison, Buford, GA (US); Daniel L. Hamlin, Round Rock, TX (US); Frank H. Molsberry, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 224 days.

(21) Appl. No.: 15/185,118

(22) Filed: Jun. 17, 2016

(65) Prior Publication Data

US 2017/0366536 A1     Dec. 21, 2017

(51) Int. Cl.
*H04L 29/06*     (2006.01)
*H04L 9/32*      (2006.01)

(52) U.S. Cl.
CPC ........ *H04L 63/0823* (2013.01); *H04L 9/3268* (2013.01); *H04L 63/083* (2013.01); *H04L 63/0861* (2013.01); *H04L 63/0884* (2013.01); *H04L 2463/082* (2013.01)

(58) Field of Classification Search
CPC ................................................ H04L 63/0823
See application file for complete search history.

(56) References Cited

U.S. PATENT DOCUMENTS

| | | | |
|---|---|---|---|
| 9,779,230 B2 * | 10/2017 | Hamlin | G06F 21/445 |
| 2005/0278775 A1 * | 12/2005 | Ross | G06Q 20/382 726/2 |
| 2007/0174207 A1 * | 7/2007 | Coulman | G06Q 10/10 705/67 |
| 2007/0220594 A1 * | 9/2007 | Tulsyan | G06F 21/31 726/5 |
| 2010/0083360 A1 * | 4/2010 | Zhang | G06F 21/32 726/7 |
| 2010/0241731 A1 * | 9/2010 | Du | G06F 17/30067 709/218 |

(Continued)

OTHER PUBLICATIONS

Broadcom Corporation, "BCM5880 Cryptographic Module Security Policy, Document Version 1.1", Revision Date: Feb. 2, 2010, 28 Pages.

*Primary Examiner* — Ali Shayanfar
(74) *Attorney, Agent, or Firm* — Fogarty LLP

(57) ABSTRACT

Systems and methods for credential translation are described. In some embodiments, an Information Handling System (IHS) may include: a host processor; an embedded controller coupled to the processor; and an off-host authentication processing system coupled to the embedded controller and segregated from the host processor, the off-host authentication processing system further comprising: an off-host processor; and an off-host memory coupled to the off-host processor, the off-host memory having program instructions stored thereon that, upon execution, cause the off-host processor to: receive a certificate from a web-access management server; store the certificate in the off-host memory; and request that a user of the IHS provide a first authentication factor to be associated with the certificate such that, when the first authentication factor is presented to the off-host processor, the certificate is released from the off-host memory.

14 Claims, 3 Drawing Sheets

(56) References Cited

U.S. PATENT DOCUMENTS

| | | | | |
|---|---|---|---|---|
| 2010/0257602 A1* | 10/2010 | Kettler | .................... | G06F 21/10 |
| | | | | 726/19 |
| 2012/0054270 A1* | 3/2012 | Foreman | ................ | G06Q 10/10 |
| | | | | 709/203 |
| 2013/0061327 A1* | 3/2013 | Thomas | .............. | H04L 63/1433 |
| | | | | 726/25 |
| 2015/0106868 A1* | 4/2015 | Lo | ........................... | G06F 21/32 |
| | | | | 726/1 |
| 2015/0319171 A1* | 11/2015 | Robison | ................ | H04L 63/08 |
| | | | | 713/171 |
| 2016/0248744 A1* | 8/2016 | Adderly | ................ | H04L 63/08 |
| 2017/0366536 A1* | 12/2017 | Robison | .............. | H04L 63/0823 |

\* cited by examiner

CREDENTIAL TRANSLATION

FIELD

This disclosure relates generally to Information Handling Systems (IHSs), and more specifically, to systems and methods for credential translation.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In many situations, an IHS (e.g., a client) may need to communicate with another IHS (e.g., a server) securely. Authentication of a client identity may take place, for example, with credentials provided over an encrypted interface. For instance, it is common for a client to set up a secure connection with a server and then prove user identity through a username and password. These credentials are referred to as "symmetric" because the same information is shared between the client and the server.

On the other hand, when asymmetric credentials are used, the infrastructure only needs a database of public keys that do not require heightened protection. Also, when public keys are put into a certificate, it is not necessary to pre-provision a database of client keys. As such, the use of asymmetric credentials can simplify system initialization and provisioning.

The inventors hereof have recognized that utilizing asymmetric key pairs to sign certificates is the new normal for device-to-website or web application authentication. Typically, however, conventional authentication techniques have the arduous downside of requiring a user to enroll each method they want to authenticate with (e.g., username and password, fingerprint, etc.) on every device for every website/application. As such, existing technologies do not scale and are very resource intensive.

SUMMARY

Embodiments of systems and methods for credential translation are described herein. In an illustrative, non-limiting embodiment, an Information Handling System (IHS) may include: a host processor; an embedded controller coupled to the processor; and an off-host authentication processing system coupled to the embedded controller and segregated from the host processor, the off-host authentication processing system further comprising: an off-host processor; and an off-host memory coupled to the off-host processor, the off-host memory having program instructions stored thereon that, upon execution, cause the off-host processor to: receive a certificate from a web-access management server; store the certificate in the off-host memory; and request that a user of the IHS provide a first authentication factor to be associated with the certificate such that, when the first authentication factor is presented to the off-host processor, the certificate is released from the off-host memory.

The first authentication factor may include at least one of: a username and password, a fingerprint, a facial scan, an iris scan, a voice sample, a smartcard, a magnetic card, or a near-field communication (NFC) token. The program instructions may cause the off-host processor to: receive, from the web-access management server, a request for the certificate in response to the user attempting to access a web resource that requires a second authentication factor different from the first authentication factor.

The attempt may include the user accessing a Uniform Resource Locator (URL) of the web resource. Additionally or alternatively, the attempt may include the user accessing a link associated with the web resource within a portal hosted by the web-access management server.

The program instructions may further cause the off-host processor to: in response to the user having provided the first authentication factor to the off-host processor prior to the attempt to access the web resource, transmit the certificate to the web-access management server.

The web-access management server may be configured to provide the second authentication factor to the web resource in response to having received the certificate from the off-host authentication processing system. Additionally or alternatively, the web-access management server may be configured to simultaneously provide a third authentication factor to another web resource in response to having received the certificate from the off-host authentication processing system.

The certificate may include the transmission of metadata to the web-access management server. The metadata may include a time of the user's latest presentation of the first authentication factor. The metadata may include a time of the user's latest login into the IHS using the off-host authentication system. The metadata may include presence data indicating the user's level of presence with respect to the IHS since the user's latest presentation of the first authentication factor.

In another illustrative, non limiting embodiment, in an IHS having an off-host authentication processing system segregated from a host processor and a host memory, the off-host authentication processing system having an off-host processor and an off-host memory, a method performed by the off-host authentication processing system, the method comprising: receiving a certificate from a web-access management server; storing the certificate in the off-host memory; requesting that a user of the IHS provide an authentication factor to be associated with the certificate such that the certificate is only retrievable from the off-host memory upon presentation of the authentication factor to the off-host processor; in response to the user attempting to access a web resource, receiving, from the web-access management server, a request for the certificate; and in response to the user having provided the authentication factor to the off-host processor in a transaction prior to the attempt to access the web resource, transmitting the certificate from the off-host memory to the web-access management server.

The web resource may require another authentication factor different from the authentication factor, and the web-access management server may be configured to provide the other authentication factor to the web resource in response to having received the certificate. The method may also comprise, prior to the transmitting the certificate to the web-access management server, adding metadata to the certificate. The metadata may include a time of the transaction. The web-access management server may be configured to determine that the time of the transaction is less than a selected value prior to providing the other authentication factor to the web resource.

In yet another illustrative, non-limiting embodiment, a storage device having program instructions stored thereon that, upon execution by an IHS, cause the IHS to: receive a certificate from a web-access management server at an off-host authentication processing system having an off-host processor and an off-host memory segregated from a host processor and host memory within the IHS; store the certificate in the off-host memory; request that a user of the IHS provide an authentication factor to be associated with the certificate such that the certificate is only retrievable from the off-host memory upon presentation of the authentication factor to the off-host processor; receive, from the web-access management server, a request for the certificate in response to the user attempting to access a web resource; and transmit the certificate from the off-host memory to the web-access management server in response to the user having provided the authentication factor to the off-host processor upon login into the IHS and prior to the attempt to access the web resource.

The web resource may require another authentication factor different from the authentication factor, and the web-access management server may be configured to provide the other authentication factor to the web resource in response to having received the certificate. The program instructions may further cause the IHS to add metadata to the certificate, the metadata may include a time of the login, and the web-access management server may be configured to determine that the time of the login is less than a maximum value.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods described herein may provide credential translation. In various embodiments, techniques described herein segregate the method/factor of authentication of the user to the device from the certificate and/or token which is released from the device to backend services. In some cases, no matter which factor the user employs to authenticate to the device, the same token is released. Moreover, the token may include a multitude of context information in the form of metadata such as, for example: time the user authenticated, if the user is still located close to device, the device's location, risk assessment, device ID, system health, etc., which may be passed to the enterprise-side's backend service, where it may be used as trust for federation.

In some cases, the metadata and policy may be used to prevent federation, or it may be passed to the destination. In various embodiments, the techniques described herein provide the ability to implement multifactor and/or any combination of factors.

Furthermore, some embodiments discussed herein may abstract the user-presented authentication material from the credential that is released from the device to gain access to a resource. This allows the device to release multiple simultaneous credentials if necessary to be allowed access the infrastructure, thus future proofing and providing legacy support. Each valid authentication (passive and active) signs the certificate signature with timestamp and is released when the resource requires it.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
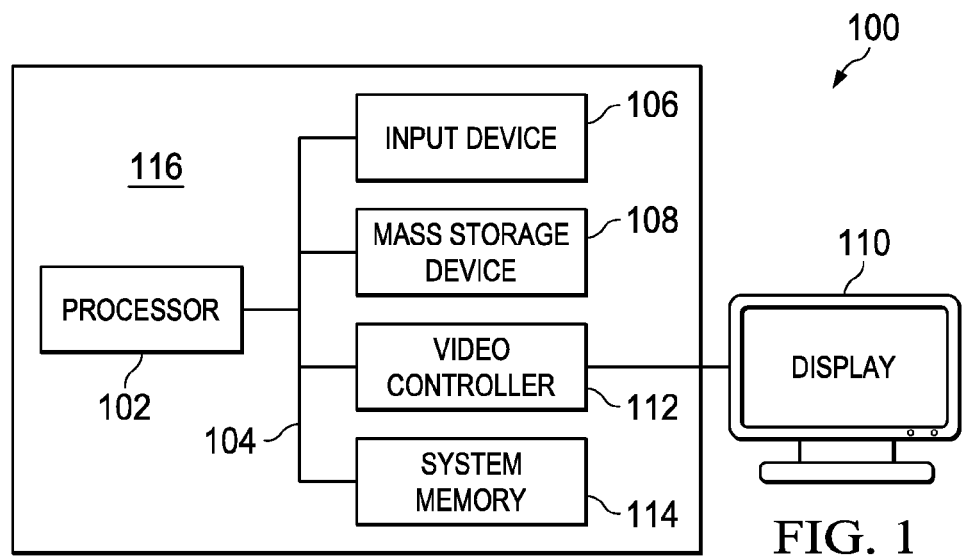
FIG. 1 is a schematic view illustrating an example of an Information Handling System (IHS) according to some embodiments.

FIG. 1 is a schematic view illustrating an example of an IHS according to some embodiments. As shown, IHS 100 includes processor 102, which is connected to bus 104. Bus 104 serves as a connection between processor 102 and other components of IHS 100. Input device 106 is coupled to processor 102 to provide input to processor 102. Examples of input devices may include keyboards, touchscreens, pointing devices such as mice, trackballs, and trackpads, and/or a variety of other input devices. Programs and data are stored on mass storage device 108, which is coupled to processor 102. Examples of mass storage devices may include hard discs, optical disks, magneto-optical discs, solid-state storage devices, and/or a variety other mass storage devices known in the art.

IHS 100 further includes display 110, which is coupled to processor 102 by video controller 112. System memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices. In an embodiment, chassis 116 houses some or all of the components of IHS 100. It should be understood that other buses and intermediate circuits may be deployed between the components described above and processor 102 to facilitate interconnection between those components and processor 102.

Figure 2:
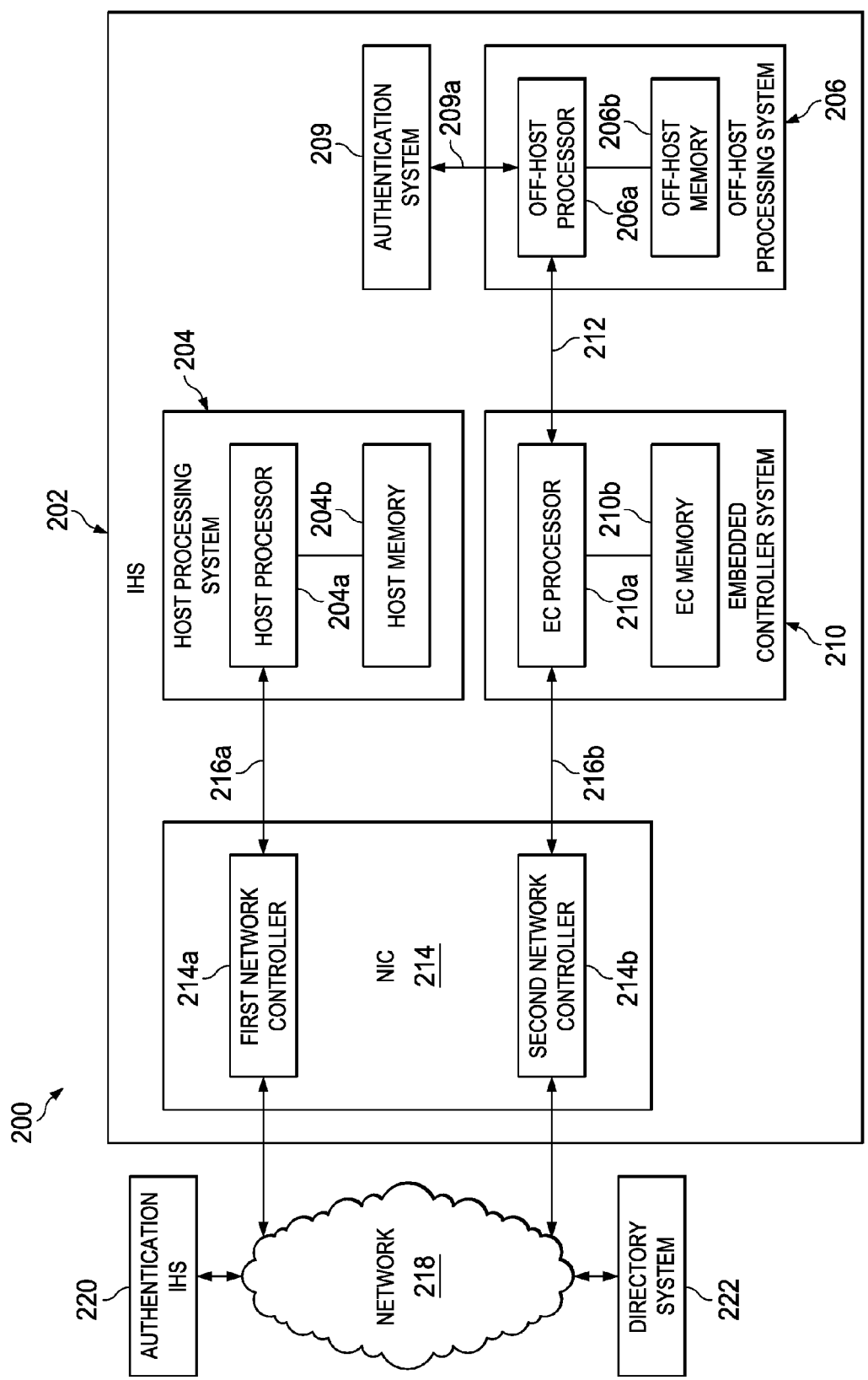
FIG. 2 is a schematic view illustrating an example of an environment where an off-host authentication processing system may be used according to some embodiments.

Referring now to FIG. 2, an embodiment of environment 200 where off-host authentication processing system 206 may be used is illustrated. Environment 200 includes IHS 202, which may be IHS 100 and/or may include some or all of the components of IHS 100. For example, IHS 100 may be a server IHS, a desktop IHS, a laptop/notebook IHS, a tablet IHS, a mobile phone IHS, and/or a variety of other IHSs. IHS 202 comprises host processing system 204, which in turn comprises host processor 204a, host memory 204b, and/or other components.

For example, host processor 204a of host processing system 204 may include processor 102, whereas host memory 204b may include system memory 114. More generally, host processing system 204 may include a variety of processing systems utilized by IHS 202 to perform processing operations related to, for example, executing an Operating System (OS) and/or other software applications.

IHS 202 also comprises embedded controller system 210 that includes embedded controller processor 210a, embedded controller memory 210b, and/or other embedded controller components. For example, embedded controller processor 210a in embedded controller system 210 may include a processor, and embedded controller memory 210b in embedded controller system 210 may comprise a memory device that includes instructions that, when executed by embedded controller processor 210a, cause embedded controller processor 210a to perform operations discussed further below.

In the illustrated embodiment, embedded controller processor 210a is coupled to the off-host processor 206a via bus 212 such as, for example, a Low-Pin Count (LPC) connection. However, bus 212 may be any variety of physical/logical bus connections that support encrypted communications, including but not limited to, an LPC connection, a USB, a Thunderbolt interface, an I²C, an SPI, a PCI, and/or other bus connections.

IHS 202 also includes network interface controller 214 that provides first network controller 214a, second network controller 214b, and/or other network interface controller components. In some embodiments, network interface controller 214 is compliant with INTEL CORPORATION's Active Management Technology (AMT) and/or "vPro" technology. In an embodiment, first network controller 214a in network interface controller 214 may be segregated, distinct from, and/or otherwise separate from second network controller 214b by assigning to the first network controller 214a a first Media Access Control (MAC) address that is different from a second MAC address that is assigned to the second network controller 214b. In another embodiment, first network controller 214a and second network controller 214b may be segregated from each other in another manner such as, for example, by providing first network controller 214a on a different network interface controller than second network controller 214b.

Host processor 204a of host processing system 204 is coupled to first network controller 214a in network interface controller 214 via bus 216a, and embedded controller processor 210a in embedded controller system 210 is coupled to second network controller 214b in network interface controller 214 via bus 216b. In some embodiments, buses 216a and 216b may be part of the same bus such as, for example, an I²C connection that couples host processing system 204 and embedded controller system 210 to network interface controller 214. However, bus 214 may be any variety of physical/logical bus connections that support encrypted communications, including but not limited to, I²C, USB, Thunderbolt, SPI, PCI, and/or other bus connections.

Host processor 204a may be configured to only have access to the first network controller 214a by providing host processor 204a a first MAC address that is assigned to first network controller 214a, while embedded controller processor 210a may be configured to only have access to second network controller 214b by providing embedded controller processor 210a a second MAC address that is assigned to second network controller 214b. However, as discussed above, first network controller 214a and second network controller 214b may be provided on different network interface controllers such that buses 216a and 216b are physically separate buses.

IHS 202 is coupled to off-host authentication processing system 206 that includes off-host processor 206a, off-host memory 206b, and/or other off-host processing components. In some cases, off-host authentication processing system 206 may be physically disposed outside of chassis 116—that is, off-host authentication processing system 206 is not a part of IHS 202; and it only coupled to it via bus 212. As used herein, the term "off-host" refers to external off-host authentication processing system 206 being distinct from host processing system 204.

Particularly, off-host processor 206a within off-host authentication processing system 206 may include a secure processor that is segregated, distinct from, and/or otherwise separate from processor 102 in IHS 202, and off-host memory 206b within external off-host authentication processing system 206 may include a memory device that is segregated, distinct from, and/or otherwise separate from system memory 114 in IHS 202 such that off-host memory 206b is accessible by off-host processor 206a but not by host processor 204a. In an example, off-host authentication processing system 206 may be provided, at least in part, using a CONTROLVAULT system that is available from DELL, INC.

Authentication system or device 209 may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices. Authentication device 209 may be coupled to off-host processor 206 in off-host authentication processing system 206 via USB or Smart Card Interface (SCI) bus 209a. However, bus 209a may be any variety of physical/logical bus connections including but not limited to, USB, SCI, Thunderbolt, I²C, SPI, PCI, and/or other bus connections.

Each of first network controller 214a and second network controller 214b is coupled to network 218 such as, for example, a local area network (LAN), the Internet, and/or a variety of other networks.

Authentication IHS 220 is coupled to network 218. In an embodiment, authentication IHS 220 may be implemented as IHS 100 discussed above with reference to FIG. 1 and/or may include some or all of the components of IHS 100. For example, authentication IHS 220 may be a server IHS or authentication server that may operates to verify user authentication credential inputs and/or verify authentication tokens. In an embodiment, authentication IHS 220 is associated with at least one authentication IHS private key and at least one authentication IHS public key. The at least one authentication IHS private key and the at least one authentication IHS public key may be stored in storage device that is accessible by authentication IHS 220.

In an embodiment, IHS 202 is associated with at least one user IHS private key and at least one user IHS public key. The at least one user IHS private key and the at least one user IHS public key may be stored in storage device that is accessible by off-host authentication processing system 206. For example, the at least one user IHS private key and the at least one user IHS public key may be stored on off-host memory 206*b*, on host memory 204*b*, and/or in a variety of other user IHS storage locations. Furthermore, the at least one user IHS public key may be shared with other systems such as, for example, authentication IHS 220.

Directory system 222 is also coupled to network 218. In an embodiment, directory system 222 may include an active directory service available from MICROSOFT CORPORATION. For example, directory system 222 may include an active directory service that is provided on a server IHS and that operates to authenticate and authorize users, assign and enforce security policies, install and update software, and/or perform a variety of other directory system operations.

In an embodiment, network 218, authentication IHS 220, and directory system 222 may be controlled by the same entity. For example, a business or government may provide, house, or otherwise maintain control of each of network 218, authentication IHS 220, and directory system 222 in order to provide an increased level of security using environment 200.

In some embodiments, the system of FIG. 2 may be used to perform out-of-band authentication such that a user must authenticate to off-host authentication processing system 206 in order to access functionality of IHS 202 that is provided by its host processing system 204. The authentication of a user to access the functionality of IHS 202 is controlled by off-host authentication processing system 206, authentication IHS 220, and/or directory system 222 that operate to verify the user and release a token to host processing system 204 that provides the user access to IHS 202.

Particularly, verification of a user may be performed by authentication IHS 220 such that IHS 202 never stores authentication credentials for any user, while authentication tokens are encrypted and exchanged between off-host authentication processing system 206 and authentication IHS 220 such that authentication IHS 220 can send an approval message to directory system 222 to provide for the release of a token to host processing system 204 that allows a user access to IHS 202 if they have been validated. Because host processing system 204 and off-host authentication processing system 206 need not interact in the out-of-band authentication system, host processing system 204 and off-host authentication processing system 206 may be physically segregated (e.g., there may be no communications bus connecting or directly connecting host processing system 204 and external off-host authentication processing system 206) to prevent any access or compromise of host processing system 204 from enabling an unauthorized user to access functionality of IHS 202.

Figure 3:
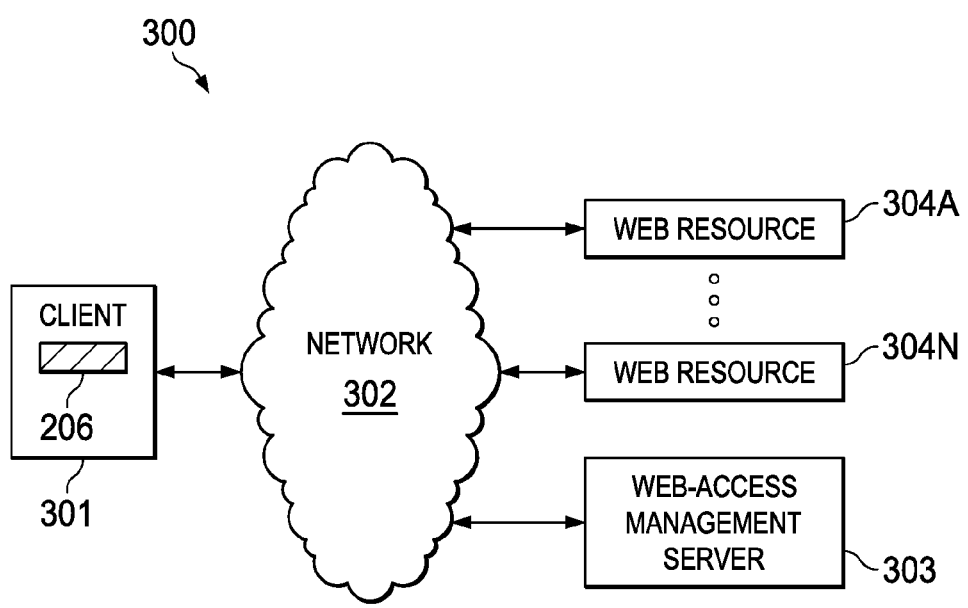
FIG. 3 is a schematic view illustrating an example of a system for credential translation according to some embodiments.

Turning now to FIG. 3, system 300 for credential translation is depicted. In various embodiments, client 301 may include an IHS such as IHS 202 of FIG. 2 having off-host authentication processing system 206. As shown in FIG. 3, client 301 is in communication with web-access management server 303 and has access to a number of web resources 304A-N via network 302, which may be similar to network 218.

Web resources 304A-N include any website, application, database, server, as well as any other entity that can be identified, named, addressed or handled, in any way, in the web at large, or in any networked information system. Meanwhile, web-access management server (WMS) 303 may include, but is not limited to, the Cloud Access Manager (CAM) system that is available from DELL, INC.

Figure 4:
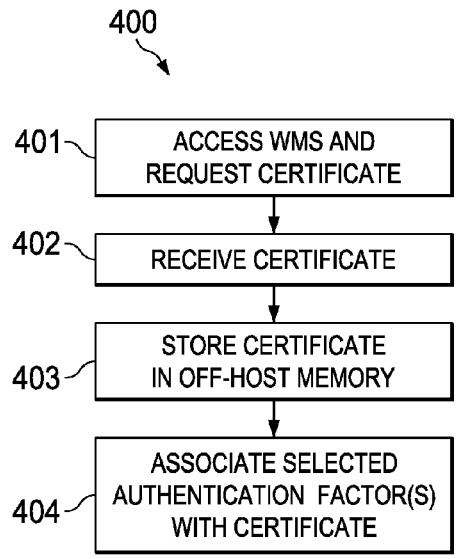
FIG. 4 is a flowchart of an example of a method for provisioning a certificate for credential translation according to some embodiments.
Figure 5:
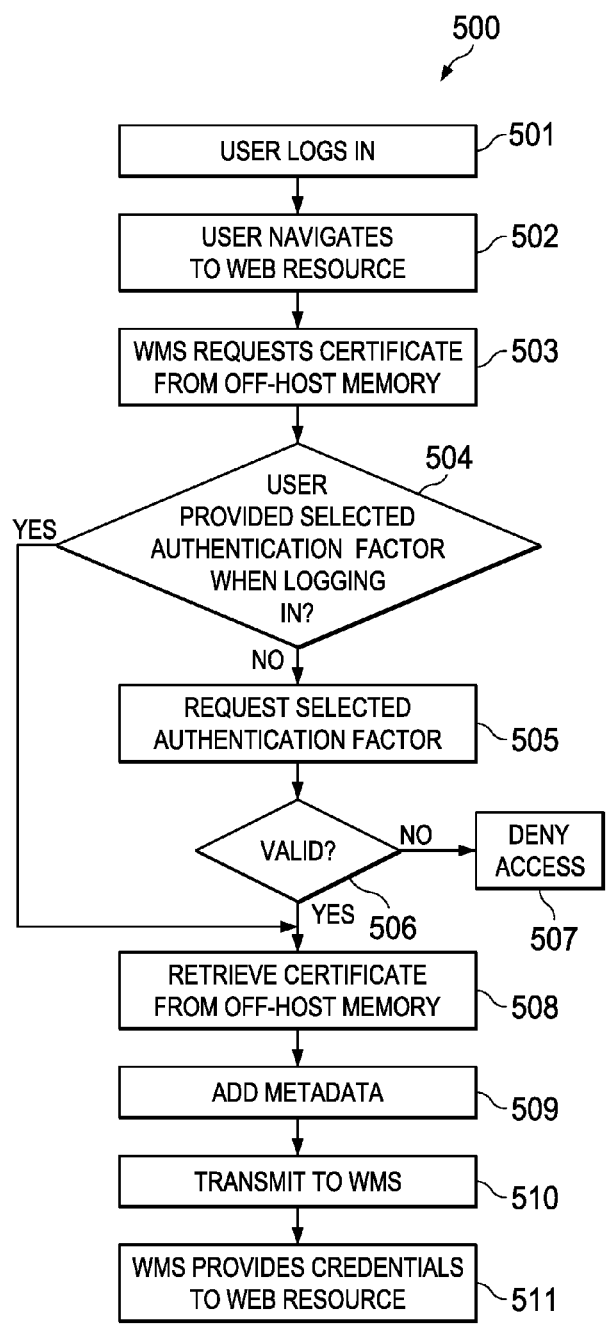
FIG. 5 is a flowchart of an example of a method for performing credential translation according to some embodiments.

Methods for providing credential translation in system 300 are described in more detail with respect to FIGS. 4 and 5. Generally speaking, in various embodiments, these methods may segregate authentication of the user to the client 301 from a certificate that is transmitted to WMS 303. Regardless of which authentication factor the user employs to log into client 301 (or to perform some other transaction), the same certificate is later released to WMS 303. In some cases, the certificate may include metadata such as, for example: time the user last authenticated, if the user is still located close to device, the device's location, any form of risk assessment, a device ID for client 301, an indication of client 301's health, etc., which may also be passed to the WMS 303, where it may be used as trust for federation.

Because client 301 includes off-host authentication processing system 206, the certificate may be signed at any time during the user's operation of client 301. That is because the off-host memory of off-host authentication processing system 206 is segregated from client 301's host processor and host memory, and therefore safe. For example, the user may log into client 301 and the act of logging in with a given authentication factor may also sign the certificate within off-host authentication processing system 206, provided that the certificate has been previously associated with the same authentication factor. The signed certificate may be then cached, for example, in the off-host memory, and released to WMS 303 upon request.

Data regarding usage of client 301 may be collected during operation of client 301 after the log in. For example, the time of the user log in and proximity data—that is, whether the user has been located in proximity to client 301 since the log in—may be added to the signed certificate as metadata. Proximity data may be obtained, for example, by monitoring the presence of a secondary device in possession of or registered to the same user operating client 301 (e.g., the user's Bluetooth phone has been connected to client 301 since the log in), by periodically performing face recognition (e.g., when client 301 has a camera or webcam), or the like.

At any point thereafter, client 301 may attempt to access one of web resources 104A-N. WMS 303 may detect the attempt either because the user employed a portal hosted by WMS 303, or by using DNS redirecting techniques. Upon detecting the attempt, WMS 303 may request the signed certificate from client 301.

Client 301 may provide the signed certificate to WMS 303 using asynchronous encryption, for example. Upon receiving the certificate, WMS 303 may determine whether or not to provide a second authentication factor to the web resource. For example, if the metadata added to the certificate indicates that the time of log in is sufficiently recent (i.e., smaller than a threshold), WMS 303 may then provide the second authentication factor to the web resource. In some cases, the risk assessment may be performed by WMS 303; in other cases, the risk assessment may be performed by off-host authentication system 206.

As such, client device 301 may have access to the web resource without having to perform the additional step of itself providing the second authentication factor. In some cases, the second authentication factor may be different from the authentication factor used at log in. For instance, the log in authentication factor may be a thumbprint and the second authentication factor may be a username and password. Therefore, the credentials used for logging in can, in effect, be translated into any other credentials required by any web resource through the use of WMS 303 in connection with a cached, signed certificate, that is securely cached in off-host authentication processing system 206 of client 301.

FIG. 4 is a flowchart of an example of a method for provisioning a certificate for credential translation according to some embodiments. At block 401, client 301 accesses WMS 303 and requests a certificate. (In order to request the certificate, a systems administrator may have preconfigured WMS 303 with a username and password combination for that particular user.) At block 402, client 301 receives the certificate. In some cases, the certificate may be signed with WMS 303's public key, and client 301 may verify the ownership of the certificate by consulting a public key database or the like.

At block 403, client 301 may store the certificate in a off-host memory. Then, at block 404, client 301 may associate any selected authentication factor with the certificate, including, but not limited to, a username and password, a fingerprint, a facial scan, an iris scan, a voice sample, a smartcard, a magnetic card, or a near-field communication (NFC) token. Both the authentication factor (e.g., a fingerprint template) and the certificate are then stored in the off-host memory.

In some cases, client 301 and WMS 303 may employ a public/private key scheme such that the certificate may itself be encrypted when sent from WMS 303 to client 301. For example, the certificate may be encrypted with the client 301's public key, and client 301 may decrypt the certificate upon receipt using its private key. Additionally or alternatively, the certificate may be encrypted with the WMS 303's private key, and the client may decrypt the certificate upon receipt using the WMS 303's public key.

At this point, client 301 has a certificate from WMS 303 that is unsigned but safely stored in an off-host memory. Also, the certificate is associated with a selected authentication factor, which in some cases may be any factor that the user has already selected to perform any other transaction. For example, if the user employs a thumbprint or facial scan to log into client 301, that same authentication factor may be used to sign the certificate. In other embodiments, however, the format of the authentication factor may be dictated by policy.

FIG. 5 is a flowchart of an example of a method for performing credential translation according to some embodiments. At block 501, the user logs into client 301 using a first authentication factor. In some cases, the same authentication factor used during the log in may also be used to sign the certificate stored in the off-host memory; therefore the certificate is also signed at block 501. Sometime thereafter, the user attempts to access or navigates to web resource(s) 104A-N at block 502.

For example, in some cases, the user may utilize a portal hosted by WMS 303. In other cases, the user may type a Uniform Resource Link (URL) into a browser, or click on a hyperlink or the like. In the latter case, client 301 and/or WMS 303 may be configured to perform DNS redirection such that, for example, the URL https://web.resource.com is redirected to https://wms.web.resource.com.

At block 503, WMS 303 requests the signed certificate cached in client 301's off-host memory. At block 504, method 500 determines whether the user has provided a selected authentication factor when logging in, and whether the certificate is signed. If not, block 505 requests the appropriate authentication factor from the user. If the factor is invalid, as determined at block 506, block 507 denies access to the web resource. If the factor is valid or if it is the same as the one used during login, control passes to block 508.

At block 508, client 301 retrieves the signed certificate from the off-host memory. At block 509, method 500 may add metadata to the signed certificate, as discussed above. For example, the time of the user's latest login, a locally performed risk assessment, and/or presence information may be added to the certificate.

At block 510, client 301 transmits the signed certificate, which includes the metadata, to WMS 303. If the time of the last login is below a threshold (e.g., less than 10 minutes ago) and/or if the risk assessment is low (e.g., a value smaller than 3 in a 1-to-10 scale) and/or the presence data indicates that the user has been operating client 301 since the last login, then at block 511 WMS 303 provides an authentication factor to the web resource. In some cases, the determination of whether to provide the credentials to the web resource may be performed by WMS 303 upon examination of the metadata within the signed certificate. Also, in some cases, the authentication factor provided to the web resource may be different from the authentication factor used to sign the certificate at login.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method performed by an off-host authentication processing system segregated from a host processor and a host memory, the off-host authentication processing system comprising an off-host processor and an off-host memory, the method comprising:
   receiving a certificate from a web-access management server;
   storing the certificate in the off-host memory;
   requesting that a user of the IHS provide a first authentication factor to be associated with the certificate, wherein the certificate is only retrievable from the off-host memory upon presentation of the first authentication factor to the off-host processor;
   in response to the user attempting to access a web resource that requires a second authentication factor, receiving, from the web-access management server, a request for the certificate; and
   in response to the user having provided the first authentication factor to the off-host processor, transmitting the certificate from the off-host memory to the web-access management server, wherein the web-access management server is configured to simultaneously provide the second authentication factor to the web resource and a third authentication factor to another web resource.

2. The method of claim 1, further comprising, prior to transmitting the certificate to the web-access management server, adding metadata to the certificate.

3. The method of claim 2, wherein the metadata includes a time of the transaction.

4. The method of claim 3, wherein the web-access management server is configured to determine that the time of the transaction is less than a selected value prior to providing the second authentication factor to the web resource.

5. A storage device having program instructions stored thereon that, upon execution by an Information Handling System (IHS), cause the IHS to:
   receive a certificate from a web-access management server at an off-host authentication processing system having an off-host processor and an off-host memory segregated from a host processor and host memory within the IHS;
   store the certificate in the off-host memory;
   request that a user of the IHS provide a first authentication factor to be associated with the certificate, wherein the certificate is only retrievable from the off-host memory upon presentation of the first authentication factor to the off-host processor;
   receive, from the web-access management server, a request for the certificate in response to the user attempting to access a web resource that requires a second authentication factor; and
   transmit the certificate from the off-host memory to the web-access management server in response to the user having provided the first authentication factor to the off-host processor, wherein the web-access management server is configured to simultaneously provide the second authentication factor to the web resource and a third authentication factor to another web resource.

6. The storage device of claim 5, wherein the program instructions, upon execution by the IHS, further cause the IHS to add metadata to the certificate, wherein the metadata includes a time of the login, and wherein the web-access management server is configured to determine that the time of the login is less than a maximum value.

7. An Information Handling System (IHS), comprising:
   a host processor;
   an embedded controller coupled to the processor; and
   an off-host authentication processing system coupled to the embedded controller and segregated from the host processor, the off-host authentication processing system further comprising:
      an off-host processor; and
      an off-host memory coupled to the off-host processor, the off-host memory having program instructions stored thereon that, upon execution, cause the off-host processor to:
         receive a certificate from a web-access management server;
         store the certificate in the off-host memory;
         request that a user of the IHS provide a first authentication factor to be associated with the certificate, wherein the certificate is only retrievable from the off-host memory upon presentation of the first authentication factor to the off-host processor;
         receive, from the web-access management server, a request for the certificate in response to the user attempting to access a web resource that requires a second authentication factor; and
         transmit the certificate from the off-host memory to the web-access management server in response to the user having provided the first authentication factor to the off-host processor, wherein the web-access management server is configured to simultaneously provide the second authentication factor to the web resource and a third authentication factor to another web resource.

8. The IHS of claim 7, wherein the first authentication factor includes at least one of: a username and password, a fingerprint, a facial scan, an iris scan, a voice sample, a smartcard, a magnetic card, or a near-field communication (NFC) token.

9. The IHS of claim 7, wherein the attempt includes the user accessing a Uniform Resource Locator (URL) of the web resource.

10. The IHS of claim 7, wherein the attempt includes the user accessing a link associated with the web resource within a portal hosted by the web-access management server.

11. The IHS of claim 7, wherein the release of the certificate includes the transmission of metadata to the web-access management server.

12. The IHS of claim 11, wherein the metadata includes a time of the user's latest presentation of the first authentication factor.

13. The IHS of claim 11, wherein the metadata includes a time of the user's latest login into the IHS using the off-host authentication system.

14. The IHS of claim 11, wherein the metadata includes presence data indicating the user's level of presence with respect to the IHS since the user's latest presentation of the first authentication factor.

* * * * *